United States Patent
Brown et al.

(10) Patent No.: US 8,520,572 B2
(45) Date of Patent: Aug. 27, 2013

(54) MULTIPLEXING CONTROL AND DATA ON MULTILAYER UPLINK TRANSMISSIONS

(75) Inventors: Tyler A. Brown, Mundelein, IL (US); Vijay Nangia, Algonquin, IL (US); Ajit Nimbalker, Buffalo Grove, IL (US); Krishna Kamal Sayana, Arlington Heights, IL (US); Xiangyang Zhuang, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 268 days.

(21) Appl. No.: 13/093,345

(22) Filed: Apr. 25, 2011

(65) Prior Publication Data
US 2011/0274059 A1 Nov. 10, 2011

Related U.S. Application Data

(60) Provisional application No. 61/331,820, filed on May 5, 2010.

(51) Int. Cl.
*H04B 7/00* (2006.01)

(52) U.S. Cl.
USPC .......................................... 370/310

(58) Field of Classification Search
USPC ................. 370/310, 328–330, 342–345, 431, 370/464
See application file for complete search history.

(56) References Cited

U.S. PATENT DOCUMENTS

| | | | |
|---|---|---|---|
| 8,264,992 B2 * | 9/2012 | Earnshaw et al. | 370/310 |
| 8,345,614 B2 * | 1/2013 | Sambhwani et al. | 370/329 |
| 8,396,160 B2 * | 3/2013 | Kim et al. | 375/295 |
| 2009/0313516 A1 * | 12/2009 | Shin et al. | 714/748 |
| 2010/0208679 A1 * | 8/2010 | Papasakellariou et al. | 370/329 |
| 2010/0239035 A1 * | 9/2010 | Blankenship et al. | 375/260 |
| 2010/0303016 A1 * | 12/2010 | Jin et al. | 370/328 |
| 2011/0274075 A1 * | 11/2011 | Lee et al. | 370/329 |
| 2012/0014242 A1 * | 1/2012 | Kim et al. | 370/203 |

OTHER PUBLICATIONS

3GPP TSG RAN WG1 #60, R1-101073 "Multiplexing schemes of control and data in multi-layer PUSCH transmission" Huawei, San Francisco, US, Feb. 22-26, 2010; 6 pages.
3GPP TSG RAN WG1 #60, R1-101186 "Discussion on Data and Control Multiplexing in UL MIMO Transmissions" Samsung, San Francisco, USA Feb. 22-26, 2010; 3 pages.
3GPP TSG RAN WG1 60bis, R1-102108 "Data and Control Multiplexing for UL Multi-Antenna Transmission" Texas Instruments, Beijing, China, Apr. 12-16, 2010; 4 pages.
Patent Cooperation Treaty, "PCT Search Report and Written Opinion of the International Searching Authority" for International Application No. PCT/US2011/034944 Aug. 3, 2011, 10 pages.
3GPP TSG RAN WG1 59bis, R1-100261 "Multiplexing of control and data in multi-layer PUSCH transmission" Huawei, Valencia, Spain, Jan. 18-22, 2010; 6 pages.

* cited by examiner

*Primary Examiner* — Dmitry H Levitan (57) ABSTRACT

The present disclosure relates to resource allocation in multi-layer transmissions in transmissions of user data and control information. A wireless terminal allocates resources in a multi-layer transmission for one more types of control information based on scheduling information and control allocation parameters. The multi-layer transmission includes control information and one or more user data streams that are mapped to multiple transmission layers and transmitted by the wireless terminal.

13 Claims, 6 Drawing Sheets

MULTIPLEXING CONTROL AND DATA ON MULTILAYER UPLINK TRANSMISSIONS

CROSS REFERENCE TO RELATED APPLICATIONS

The present application is a non-provisional application of U.S. provisional Application No. 61/331,820 filed on 5 May 2010, the contents of which are incorporated herein by reference and from which benefits are claimed under 35 U.S.C. 119.

FIELD OF THE DISCLOSURE

The present disclosure relates generally to wireless communications and more particularly to a multi-antenna precoding transmission based on antenna grouping in a wireless communication system.

BACKGROUND

The Third Generation Partnership Project (3GPP) is developing a Long Term Evolution (LTE) standard using a physical layer based on globally applicable evolved universal terrestrial radio access (E-UTRA). In the LTE Release-10 (Rel-10) specification, uplink control information (UCI) is conveyed between the wireless terminal, referred to as the user equipment (UE), and the base station, referred to as the eNB. The UCI consists of channel quality information (CQI), Precoding Matrix Information (PMI), rank indication (RI), and downlink ACK/NAK indicators. Channel quality information refers to the quality of the downlink channel, the channel from the eNB to UE, as well as recommendations on the precoding to be used by the eNB based on observations of the downlink channel by the UE. Rank indication information is a recommendation by the UE on the number of layers or information-bearing streams that can be supported in the downlink channel with spatial multiplexing or multiple-input multiple-out (MIMO) transmission. ACK/NAK indicators are used to notify the eNB of successful decoding of information packets, referred to as transport blocks, sent on the downlink. The transmission of UCI by the UE occurs in 1 ms time intervals, termed subframes which occur either periodically for the case of CQI and RI or a fixed time after a downlink transmission for ACK/NAK indication. In addition to UCI the UE also transmits user data on the uplink during subframes specified by a scheduling message sent by the eNB on a downlink control channel. The subframes in which UCI is transmitted may or may not coincide with subframes containing user data. When a subframe is to contain UCI only but is not scheduled for user data transmission, the UCI is sent on the physical uplink control channel (PUCCH) whose modulation and coding is tailored specifically for efficient transmission of the small payloads of uplink control signaling. Likewise when only user data and not UCI is to be transmitted in subframe, a physical channel termed the physical uplink shared channel (PUSCH) designed for typically larger and variable sized payloads is used. The remaining case is when both UCI and user data are to be sent in the same subframe. There are several possibilities to utilize the PUCCH and PUSCH to accomplish this. First, both the PUCCH and PUSCH can be transmitted simultaneously. However both of these physical channels use Discrete Fourier Transform Spread Orthogonal Frequency Division Multiplexing (DFT-SOFDM) modulation or the Single-carrier Frequency Division Multiple Access (SC-FDMA) which has the desirable property that it yields time-domain signals whose envelopes have a low peak-to-average ratio and therefore can be amplified with high efficiency power amplifier while still meeting distortion and out-of-band requirements. The low peak-to-average property is compromised however when two DFT-SOFDM signals are transmitted simultaneously. The second alternative is to multiplex UCI and user data onto a single PUSCH. The LTE downlink transmission is based on Orthogonal Frequency Division Multiplexing (OFDM).

Multiplexing control information and user data onto a single DFT-SOFDM modulated channel has its own challenges however, control channel information must be able to be decoded reliably—a 0.01 to 0.0001 is a typical error rate—while at the same time maximizing the efficiency of user data transmission which, due to channel coding, can have symbol error rates as large as 0.1. Different types of UCI may have different reliability requirements, i.e. for CQI, a higher error rate such as 0.01 may be tolerable but for Rank and A/N, lower error rates such as 0.001~0.0001 may be preferable because the system throughput loss may be severe otherwise. The control information and user data may also have different latency requirements which requires that different receiver types with different performance be used on PUSCH symbols used for UCI vs. symbols used for channel coded user data.

When spatial multiplexing transmission is performed on the PUSCH the multiplexing of UCI and user data has several unique challenges. Spatial multiplexing refers to the transmission of more than one symbol stream from multiple transmission antennas. In such a case, there is a need for a method and apparatus to determine how uplink control information may be multiplexed with uplink data.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

The present disclosure relates generally to wireless communications and more particularly to resource allocation in multi-layer transmissions in transmissions of user data and control information. A wireless terminal allocates resources in a multi-layer transmission for one more types of control information based on scheduling information transmitted from a base station and control allocation parameters transmitted for a base station. The multi-layer transmission consists of control information and one or more user data streams that are mapped to multiple transmission layers and transmitted by the wireless terminal.

The most common occurrence of spatial multiplexing in LTE occurs when two transport blocks (which are two sets of information bits) are separately channel coded into two codewords. The coded bits of the codewords are then modulated to form a set of complex-valued symbols which are then multiplexed with coded UCI symbols and the resulting symbols are divided into one or more symbol streams or layers. Each transport block, or equivalently codeword, has an associated set of layers. The symbols comprising each layer are transmitted on each of the transmit antennas by the precoding operation. The transmitted layers corresponding to each codeword therefore contain both channel coded user data and channel coded UCI symbols. The eNB receiver attempts to separate the layers by for example an minimum-mean squared error (MMSE) receiver, followed by demodulation each layer, and finally demultiplexing of the user data and UCI symbols to their respective channel decoders. The reliability of demodulated symbols from different layers can differ greatly for several reasons. First, although all layers are transmitted with equal power, some layers are attenuated more than others by the channel. Second, perfect separation of layers by the receiver is not possible and therefore inter-layer interference is present. Finally, some layers may be demodulated with a different receiver type. One example is when a successive interference cancellation (SIC) receiver is used. Here a first codeword is decoded based on the received symbols from that first codeword one or two layers. These received symbols have been contaminated with interlayer interference. The decoded first codeword is then re-encoded, re-modulated, and fed through the channel as estimated by the receiver to form a replica of the component of the received signal attributable to the first codeword. This replica is the subtracted off the total received signal. If the first codeword is decoded correctly, the inter-layer interference affecting the decoding of second codeword is removed and therefore the reliability of the second codeword's symbols is increased compared to that of a conventional receiver. Because the reliability of UCI decoding depends on both the number of symbols allocated to control information and the distribution of those symbols between layers, there is a need for a means of determining the number of symbols which should be allocated to UCI on each layer to insure sufficient UCI decoding.

Typically, the control information such as CQI may be encoded using a convolutional encoder, a block code such as Reed-Muller code encoder. In certain cases, a cyclic redundancy check (CRC) coder may also be used to code control information to ensure error detection. When the control information or control block comprises of one or two bits of information, simple coding techniques such as repetition coding or (3,2) Simplex coding may be used. For a transport block (i.e. a data block), the physical layer first attaches a CRC for error detection. The transport block may then be segmented into one or more code block segments, each of which may be attached with another CRC, coded using a channel coder such as turbo code, interleaved and rate-matched to a code rate to fit the available number of resources on the channel. For simplicity, other steps such as scrambling the bits, mapping to the modulation symbol and other intermediate steps are not described here.

The embodiments include a method for allocating uplink resources in a wireless terminal for multi-layer transmission consisting of both control information and multiple streams of user data. The wireless terminal receives a scheduling message from a base station that includes scheduling information that may include an allocation of frequency resources to be used by the transmission. The scheduling information may also include the modulation orders of the multi-layer transmission and the number of information bits transmitted from each data stream in a fixed transmission time interval or subframe. Based on the received scheduling information and the received control allocation parameters, the number of uplink resources allocated for control channel information on multiple transmission layers is determined. Control information to be transmitted during a transmission time interval, alternately referred to as a control block below, is channel coded and the channel coded symbols are distributed between transmission layers. The multiple transmission layers are then transmitted through a plurality of transmit antennas at the wireless terminal.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure comprises a variety of embodiments, such as a method, an apparatus, and an electronic device, and other embodiments that relate to the basic concepts of the disclosure. The electronic device may be any manner of computer, mobile device, or wireless communication device.

Figure 1:
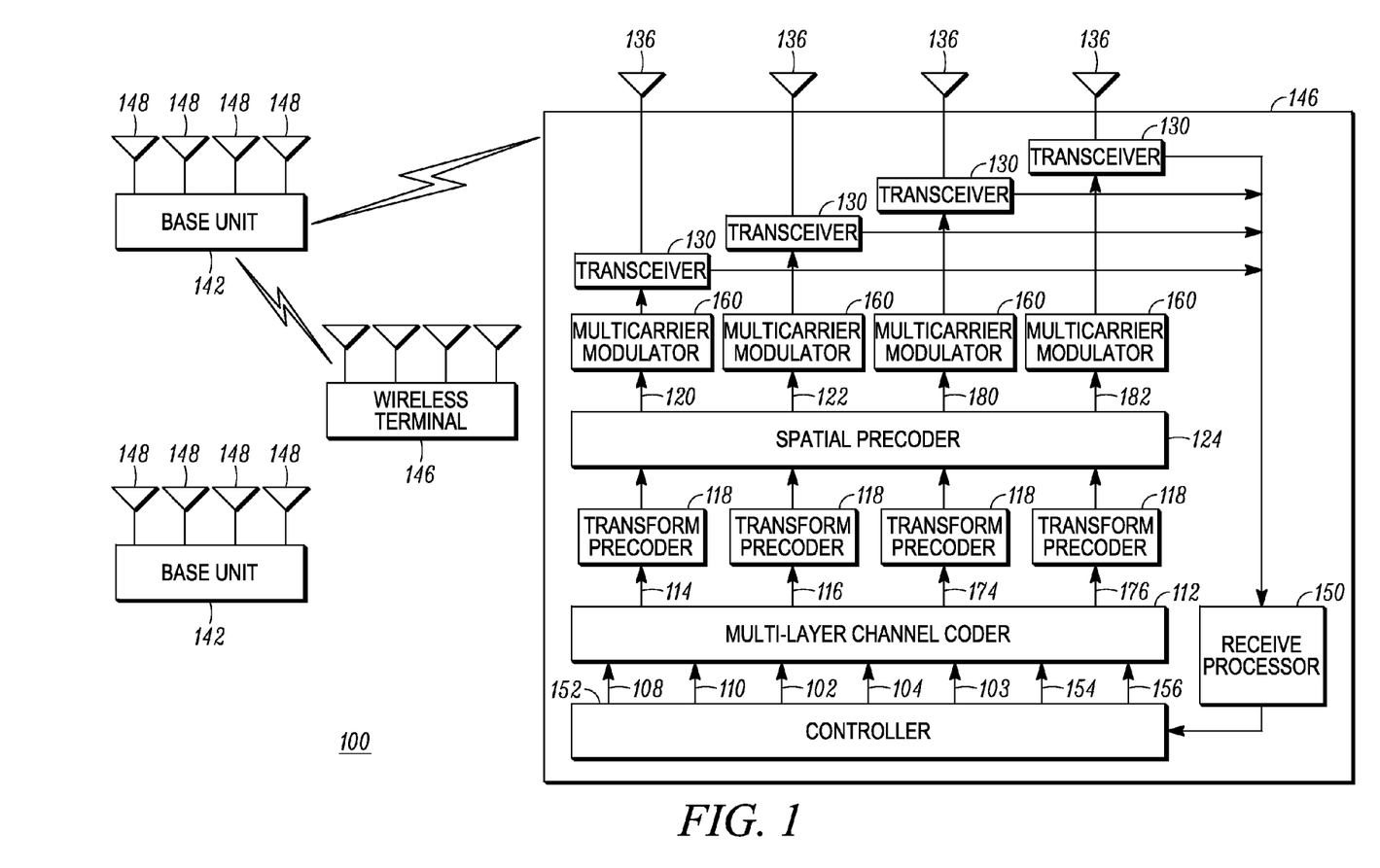
FIG. 1 illustrates a wireless communication system according to a possible embodiment.

FIG. 1 block diagram of a system 100 for communicating control information and multiple user data streams with multi-layer transmission data in accordance with an exemplary embodiment of the present invention. The wireless terminal 146 can consist of a plurality of antennas 136 coupled to transceivers 130. The wireless terminal 146 can also include a receiver processor 150 coupled to the transceivers 130 and also coupled to a controller 152. The controller 152 can be configured to control operations of the wireless terminal 146. The controller 152 can be coupled to the multi-layer channel coder 112 through the user data streams 108 and 110. The user data streams 108 and 110 contain data to be transmitted from the wireless terminal to the base unit. The user data streams deliver information bits to the multi-layer channel coder in packets or transport blocks (TB) once every transmission interval for example 1 ms subframes. The controller 152 also outputs control information signals 102, 103, and 104 to the Multi-Layer Channel Coder 112. The control information signals can be information related to the quality or characteristics of the transmission link between the base unit 142 and the wireless unit 146 as measured by the receive processor 150. One example of the characteristic of this transmission link is the channel quality of the link which can be expressed as the channel coding rate and modulation order that can be supported on the link while obtaining a predefined error rate of transmitted packets. Another example of control information 102, 103, 104 related to the characteristics of the transmission link between the base unit 142 and the wireless unit 146 is a recommended precoding matrix to be applied by the base unit. Yet another example of the characteristic of the transmission link between base unit 142 and the wireless unit 146 is the number of transmission layers that can be supported. In addition to characteristics of the link between base unit 142 and wireless unit, control information 102, 103, and 104 may also include acknowledgments (ACKs) of transmissions made by the base unit 142 that have been successfully decoded by the wireless unit 146 or indications that such transmissions were not successful.

The controller 152 may also provide Multi-Layer Channel Coder 112 with scheduling information 154 and control parameters 156. Scheduling information 154 is sent in control messages sent from the base unit 142 to the wireless unit 146. The receiver 150 decodes these messages and transfers them to the controller 152. The scheduling information may consist of the bandwidth of a scheduled uplink transmission measured in subcarriers, the modulation order such as quadrature phase shift keying (QPSK), 16 quadrature amplitude modulation (QAM), or 64 QAM, Scheduling information may also include the transmission parameters for an uplink transmission such as modulation coding scheme, resource allocation, transmit power control (TPC), HARQ information, New Data Indicator (NDI), CQI request bit, Sound reference Signal (SRS) request bit, Redundancy Version Indicator, etc. Typically, the scheduling information is associated with a block of information bits (known as transport block), though it may also include information such as transmission parameters of uplink control signaling such as messages requesting uplink sounding reference signal transmission (SRS), uplink Acknowledgements or negative acknowledgements (ACKs or NACKs), channel quality Indicators, etc. and. The scheduling information 150 may consist of information for transmission of one or more streams of user data. The scheduling information 154 may be transmitted for the base unit 142 either semi-statically with an update rate of hundreds of milliseconds to on the order of seconds or may be transmitted dynamically with update rates on the order of ms. The control parameters 156 are transmitted in control messages from the base unit 142 to the wireless unit 146. The control allocation parameters may be specific to a particular wireless terminal and may be signaled either on a semi-static or dynamic basis.

The spatial channel coder 112 operates on the user data streams 108 and 110 and the control information 102, 103, and 104 to generate channel coded layer data 114, 116, 174, 176. The multi-layer channel coder 112 adds redundancy to the user data streams and control information to allow errors which occur in the transmission link between wireless terminal 146 and base unit 142 to be corrected by the receiver in the base unit. The multi layer channel coder 112 also distributes the user data streams 108 and 110 and the control information 102, 103, and 104 between transmission layers of coded layer data 114, 116, 174, 176. The coded layer data may be fed to transform precoders 118. The transform precoders generate code-domain layer data by performing a linear transformation on the coded layer data. An uplink resource or transmission resource is defined as one coded layer symbol on one layer and therefore the total number of uplink resources is the product of the number of subcarriers used for transmission, $M_x$, the number of DFT-SOFDM symbols used in the transmission (excluding pilot or reference symbols), $N_{sym}$, and L is the total number of layers available or assigned for transmission. The set of uplink of resources for a transport block is therefore specified by the number of DFT-SOFDM symbols, the number of subcarriers, and the layers associated with that transport block. The number of subcarriers may be indicated by the resource allocation scheduling. The layers associated with a particular transport block may be indicated by precoding matrix indication (PMI) or rank indication (RI) scheduling information. For example a PMI field taking a value between 1 and 24 could indicate single layer transmission and therefore a single transport block is to be transmitted while a PMI field taking values between 25 and 40 two layer transmission with layer 1 associated to transport block 1 and layer 2 associated to transport block 2. A PMI field of 41 through 52 indicates three layer transmission with layers 1 associated to transport block 1 and layers 2 and 3 with transport block 2. A PMI field of 53 indicates four lank transmission with layers 1 and 2 associated with transport block 1 and layers 3 and 4 associated with transport block 2. If the coded layer data generated during a transmission time interval on layer/is collected into a sequence of values $s_l(0), s_l(1), L, s_l(M_{sc}N_{sym}-1)$ then the nth element of the lth's layer transform precoder output denoted by the sequence $x_l(0), x_l(1), L, x_l(M_{sc}N_{sym}-1)$ may be expressed as $$x_l(n) = \sum_{k=0}^{N_l-1} V(n,k)s_l(k)$$

where V(n,k) is a set of complex-valued number that defines the transform coding performed by the transform precoders. The transform precoding operation may be FFT-based precoding where V(n,k) is defined as $$V(n,k)=e^{j2\pi nk/N}.$$

FFT-based transform precoding generates output signals which have the single carrier property or have an approximation to the single carrier property. A signal with the single carrier property has a constant envelope over time and therefore signals with this property or approximations to this property have low ratios of peak power to average power. Signals with low peak-to-average ratios are desirable because they can be amplified with high efficiency power amplifiers. Those skilled in the art will recognize that the transform precoding operation perform in 118 need not be performed in systems that perform orthogonal frequency division multiple access (OFDM) instead of DFT-SOFDM modulation.

The code-domain layer data of the four transmission layers are then fed to the spatial precoder 124 which can generate the inputs 120, 122, 180, and 182 to the wireless terminal antennas 136 through the transceivers 130. Spatial precoding 124 can be performed with a precoding matrix which is used to form multiple weighted-combinations of the transmitter outputs. The weighted combinations are then applied to multi-carrier modulators 160 which modulates each input symbol to equally-spaced subcarriers.

Figure 2:
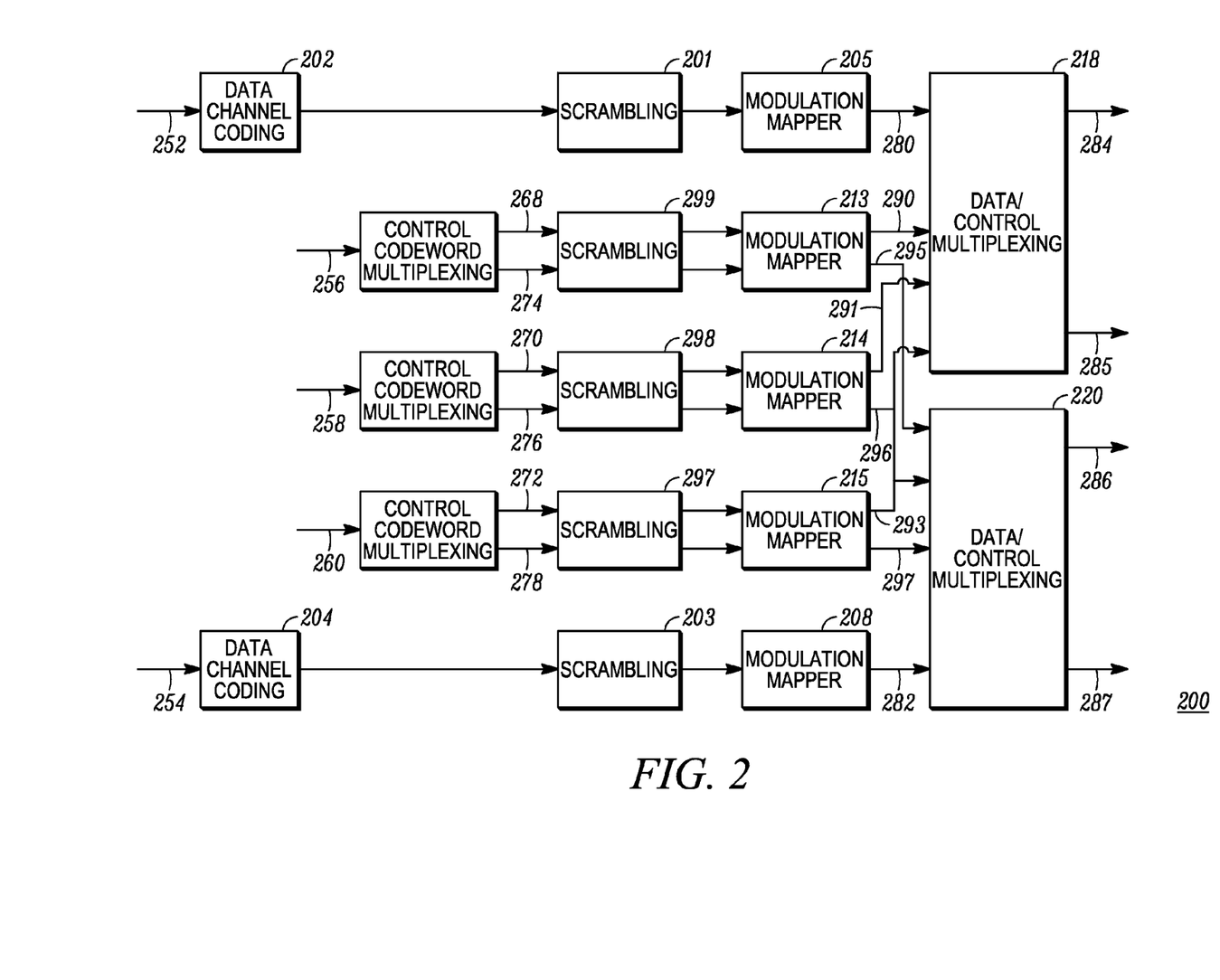
FIG. 2 illustrates Multi-Layer Channel Coding according to a possible embodiment.

One skilled in the art can recognize that while the embodiment of the wireless terminal 146 described has four coded data layers 114, 116, 174, 176 and four transmit antennas 136 other embodiments may have any number of transmit antennas and any number of layers as long as the number of transmit antennas is at least as large as the number of layers. Similarly, more than two user data streams 108 and 102 may generated by the controller as long as the number of user data streams is no larger than the number of layers. FIG. 2 is an embodiment of the multi-layer channel coder 112. User data transport blocks 252 and 254 are channel coded by the data channel coders 202 and 204. The data channel coders may be of convolutional, turbo, or block coding such as Reed Muller (RM) code type. The data channel coders output is coupled to the scrambling blocks 201 and 203 which remove the correlation between coded bits. Scrambling may be accomplished by multiplying the channel coded bits with a pseudo-random sequence of bits generated for example by a maximum-length shift register or a gold code sequence generator. The scrambled bits are then grouped together to form complex-valued modulation symbols in the modulation mappers 205 and 208. The modulation mapper 205 maps groups of $Q_{m,1}$ bits to form modulation symbols. For example the modulation symbols may be QPSK, 16QAM, or 64 QAM, for $Q_{m,1}$ equal to 2, 4, or 6 respectively. Similarly the modulation mapper 207 maps groups of $Q_{m,2}$ bits to modulation symbols. Note that the modulation orders $Q_{m,1}$ and $Q_{m,2}$ used on each of the codewords may be different. The modulation symbols are output into codewords 280 and 282 with each codeword being the modulation symbols to be transmitted during a fixed transmit time interval. The control information 256, 258, and 260 are fed to control channel coding and multiplexing blocks 212, 214, and 216. The control channel coding and multiplexing blocks 212, 214, and 216 perform channel coding of the control information and multiplexing of the control coded bits to two codeword outputs. These operations are performed based on scheduling information 292 and control parameters 294. The coded control bits of the first multiplexed codewords 268, 270, 272 are fed to scrambling blocks that operate similar to scrambling blocks 201 and 203 and then to modulation mappers 213, 214, and 215 respectively which group sets of $Q_{m,1}$ bits and map the result to complex-valued coded symbols 283, 284, and 285. A similar operation is performed on the second codeword outputs 274, 276, and 278 to generate coded symbols 299, 298, and 297 with the modulation being of order $Q_{m,2}$.

The user data symbols of the first codeword, 280, are multiplexed with the encoded control symbols 290, 291, and 293 in data/control multiplexer 218. During each transmission time interval, the data/control multiplexer 218 outputs $L_1$ arrays of transmission layer symbols 284 and 285 of size $M_{sc} \times N_{sym}$ corresponding to the $L_1$ layers of transport block 1. Similarly, the user data symbols of the second codeword, 282, are multiplexed with coded control symbols 295, 296, and 297 in data/control multiplexer 220 to form $L_2$ arrays of transmission layer symbols 286 and 287, each of size $M_{sc} \times N_{sym}$.

Figure 3:
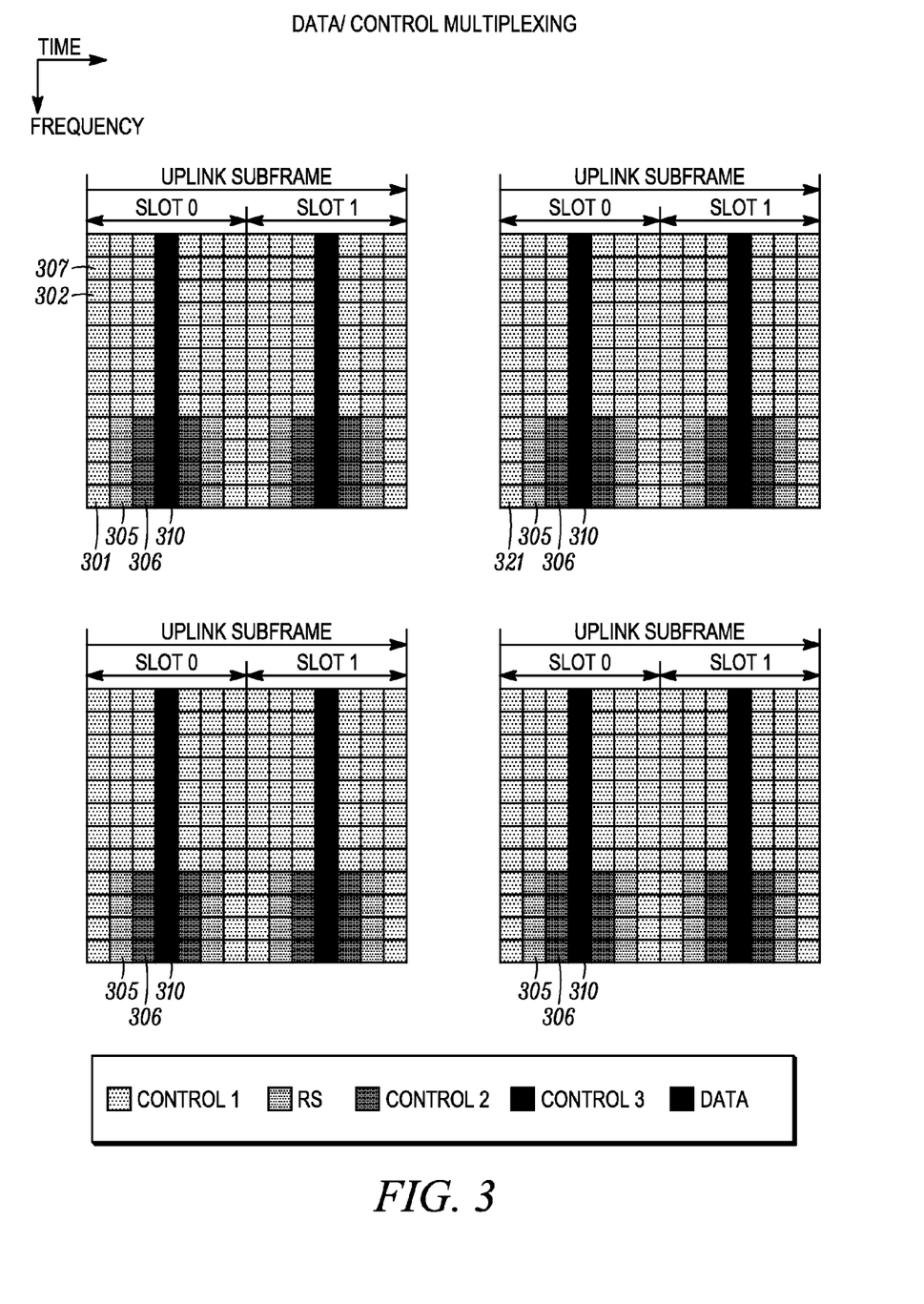
FIG. 3 illustrates Data/Control Multiplexing according to a possible embodiment.

The operation of the data/control multiplexer 218 will now be described. The operation of the data/control multiplexer 220 is similar. FIG. 3 illustrates the operation of the data/control multiplexer 218. The symbols 302 corresponding to the symbols of multiplexed codeword 280 are mapped to array 301 of first transmission layer symbols and to array 321 of a second transmission layer symbols, each of which has vertical dimension equal to the number of subcarriers in the allocation, $M_{sc}$, and horizontal dimension equal to the number of DFT-SOFDM symbols, $N_{sym}$, in the subframe. Similarly, control symbols corresponding to three control types of control information 305, 306, 307 are also mapped to arrays 301 and 321. Also shown on the grid are reference symbols 310 which are a predefined set of symbols known by both the transmitter and receiver and used for channel estimation by the base unit. More generally the data/controller multiplexer maps symbols of the first multiplexed codeword to those uplink resources associated with the first transport block layers and maps symbols of the second multiplexed codeword to those uplink resources associated with the second transport block.

Figure 4:
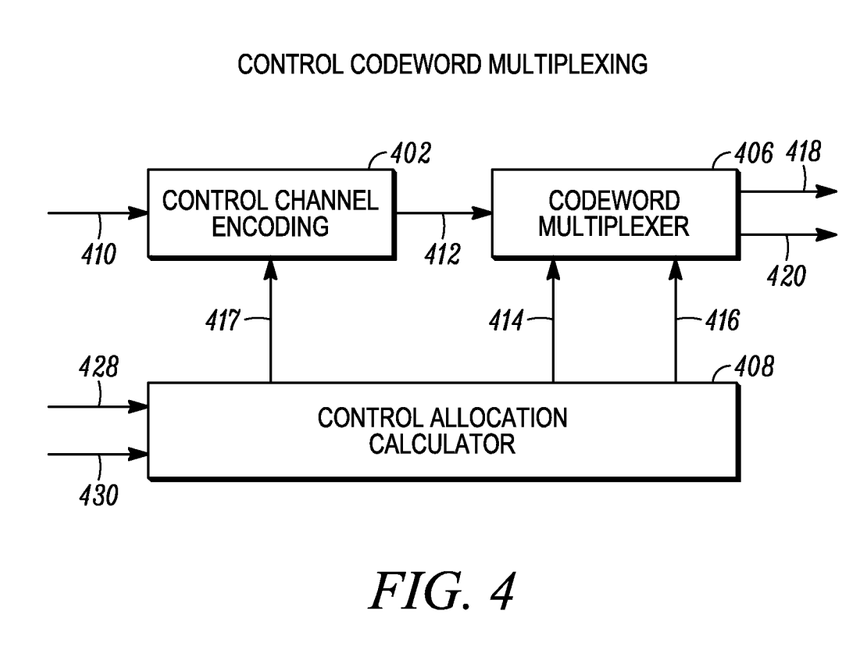
FIG. 4 illustrates Control Codeword Multiplexing.

The operation of the control channel coding and multiplexing block 212 will now be described in more detail with the aid of FIG. 4. During each transmission time interval O control information bits, 410, are channel coded with the control channel encoder 402 to generate a vector of encoded control bits, 412. Various channel encoding schemes may be used including convolutional, turbo, simplex, Reed-Mueller, or other block coding schemes. The length of the vector of encoded control bits, Q, 417, is determined by the control allocation calculator 408 and therefore the coding rate of control channel information, Q/O, is therefore determined by the control allocation calculator from scheduling information and control allocation parameters. The codeword multiplexer 406 distributes the Q encoded control bits 412 to the $Q_1$, 414, bits of the first multiplexed codeword 418 and $Q_2$ bits of the second multiplexed codeword 420 such that all encoded control bits are allocated to one or the other multiplexed codeword and therefore $Q=Q_1+Q_2$. The parameters $Q_1$, 414, and $Q_2$, 416, are determined by the control allocation calculator 408 based on scheduling information 428 and control allocation parameters 430. The encoded control bits may be distributed to the two multiplexed codewords in a variety of ways. For example if $Q_1=Q_2$ the first multiplexed codeword may get every second coded control bit beginning with the first bit while the second multiplexed codeword may get every second coded control bit beginning with the second bit. More generally for non-zero $q_1$ and $q_2$ the first multiplexed codeword may be assigned the first $q_1$ control-coded bits, the second multiplexed codeword assigned the next $q_2$ control coded bits, the next $q_1$ control-coded bits to the first multiplexed codeword output, and so on. A second example is the first $Q_1$ encoded control bits being assigned to the first multiplexed codeword output and the remaining $Q_2$ encoded control bits being assigned to the second multiplexed output.

The multiplexing control channel coding and multiplexing blocks 214 and 216 operate in a similar manner to multiplexing control channel coding and multiplexing blocks 212. These blocks however may use different channel coders, e.g. Reed-Mueller instead of convolutional coding, different modulation mappers, e.g. 16QAM instead of QPSK, than used in multiplexing control channel coding and multiplexing blocks 212. The control allocation calculators in blocks 214 and 216 may also not use the same algorithm for calculating the number of bits assigned to each multiplexed codeword.

Figure 5:
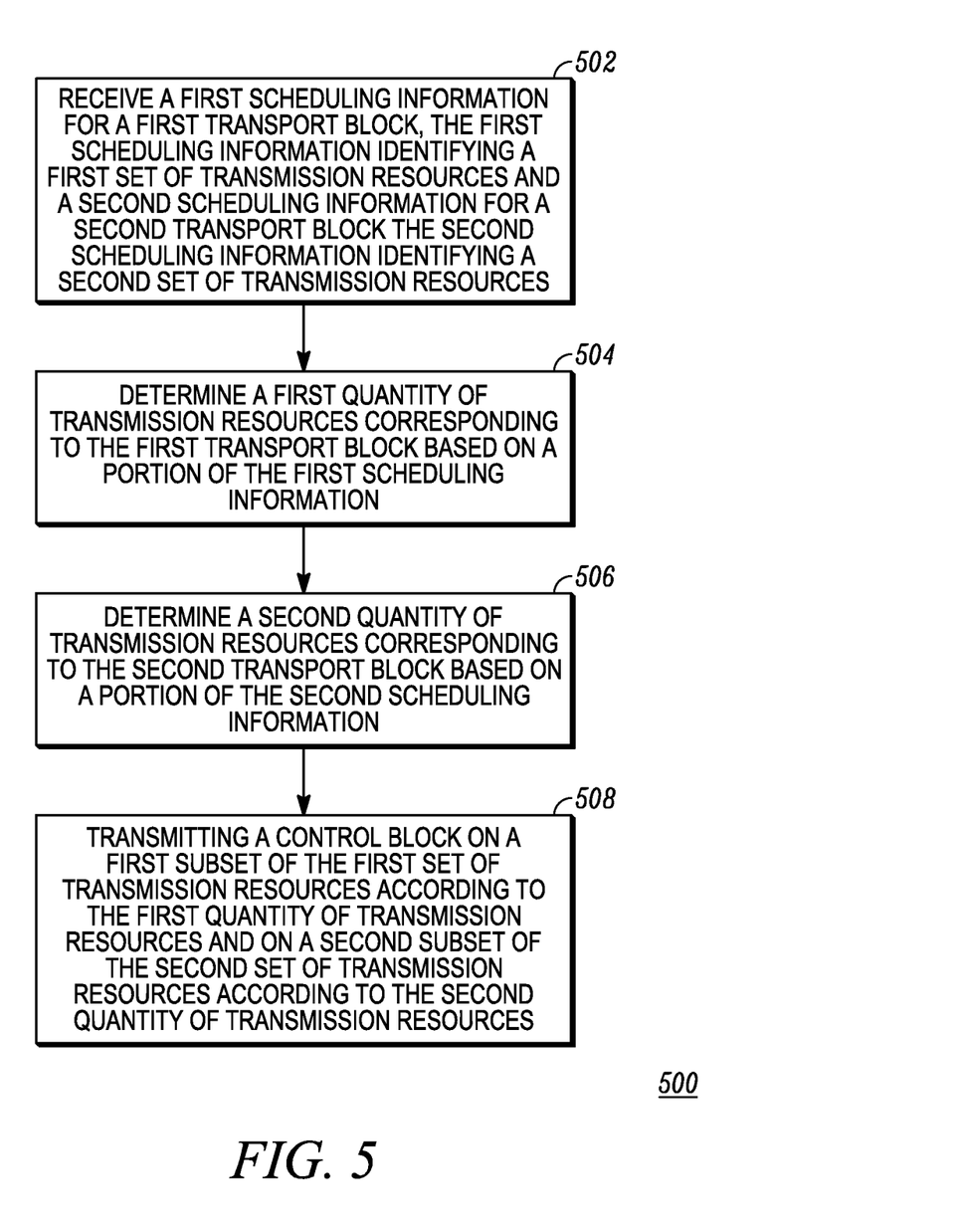
FIG. 5 is a flowchart of one embodiment of the invention.

FIG. 5 shows an embodiment in accordance with the invention, the embodiment comprising the steps of Receiving a first scheduling information for a first transport block, the first scheduling information identifying a first set of transmission resources and a second scheduling information for a second transport block the second scheduling information identifying a second set of transmission resources 502, determining a first quantity of transmission resources corresponding to the first transport block based on a portion of the first scheduling information. (portion=MCS, resource allocation) 504, determining a second quantity of transmission resources corresponding to the second transport block based on a portion of the second scheduling information 506, transmitting a control block on a first subset of the first set of transmission resources according to the first quantity of transmission resources and on a second subset of the second set of transmission resources according to the second quantity of transmission resources 508.

Figure 6:
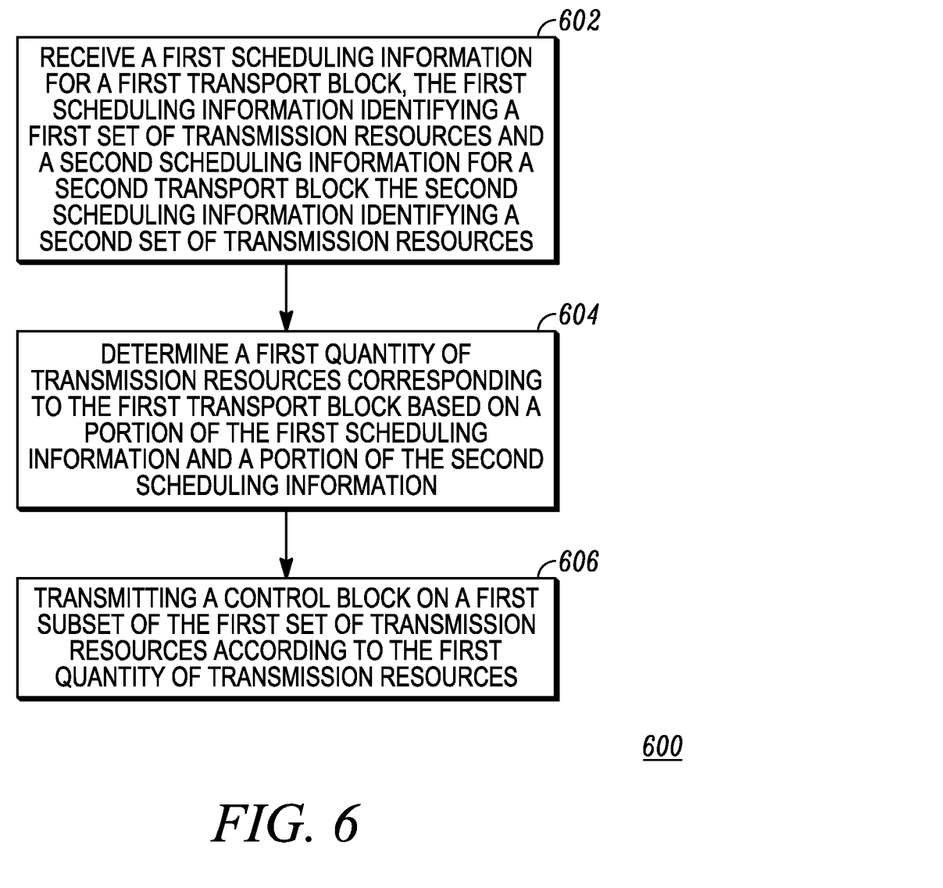
FIG. 6 is a flowchart of a second embodiment of the invention.

FIG. 6 shows an another embodiment in accordance with the invention, the embodiment comprising the steps of Receiving a first scheduling information for a first transport block, the first scheduling information identifying a first set of transmission resources and a second scheduling information for a second transport block, the second scheduling information identifying a second set of transmission resources 602, Determining a first quantity of transmission resources associated with the first transport block based on the first and the second scheduling information 604, Transmitting a control block on a first subset of the first set of transmission resources according to the first quantity of transmission resources 606.

The control allocation calculator 408 will now be described in more detail. The control allocation calculator calculates the quantity of transmission resources to be used for transmission of uplink control information. Scheduling information comprises of the modulation scheme indicators scheme (MCS) indicators, a resource allocation indicator, such as an indication of number of subcarriers in frequency, and number of DFT-SOFDM symbols in time domain that are assigned for the data transmission and other portions (e.g. number of spatial layers) required to determine the quantity of transmission resources for control information, etc. Scheduling information in the form of $N_s$ parameters $S_1, S_2, \ldots, S_N$, from a decoded control channel message (or a downlink control channel message) and $N_p$ control allocation parameters $P_1, P_2, \ldots, P_{N_p}$ are used to calculate the number of coded bits $Q_1$ and $Q_2$ respectively which are distributed to the first and second multiplexed codeword outputs respectively, the set of transmission resources used for the first multiplexed codeword output may be determined based on a first scheduling message, or equivalently, the dimension of the first multiplexed codeword output may be determined based on a first scheduling message. Since the modulation mappers 213, 214, and 215 group sets of $Q_{m,1}$ bits before mapping to modulation symbols, the number of coded modulation symbols (or a quantity of transmission resources) derived from the first multiplexed codeword $Q_1' = Q_1/Q_{m,1}$ may equivalently be calculated. For certain uplink control information such as the uplink Acknowledgements and Negative Acknowledgements (A/N), or rank information (RI), the coded modulation symbols are mapped to the outermost constellation points for reasons such as to maximize the Euclidean distance that leads to improved performance. Thus, while the data modulation is 64-QAM, the control modulation may be using only QPSK modulation, where the four constellations points for the QPSK are the outermost constellation points of 64-QAM used for data modulation. Similarly, the control allocation calculator may calculate the number of coded modulation symbols derived from the first multiplexed codeword $Q_2' = Q_2/Q_{m,2}$. The operation of the control allocation calculator may therefore be described by the equations, where $F_1, F_2$ are functions that yield an integers as results, and O is the number of information bits in the control block.

$$Q_1' = F_1(O, S_1, \ldots, S_{N_s}, P_1, \ldots, P_{N_p})$$

$$Q_2' = F_2(O, S_1, \ldots, S_{N_s}, P_1, \ldots, P_{N_p}).$$

Yet another embodiment of a control allocation calculator 408, scheduling information, and control allocation parameters is described next. Here the scheduling information $S_1$, $S_2$ comprises of the modulation scheme indicators scheme (MCS) indicators, a resource allocation indicator, such as an indication of number of subcarriers in frequency, and number of DFT-SOFDM symbols in time domain that are assigned for the data transmission and other portions (e.g. number of spatial layers) required to determine the quantity of transmission resources for control information, etc. Typically, additional signaling (such as higher-layer or Downlink grants) may be used to further adjust or account for the resources available for uplink, e.g. for transmissions such as uplink Sounding Reference Signals (SRS), and Uplink reference Signals (or pilots). The MCS indicators, one for each transport block, indicate a nominal coding rate to be used by the user data channel encoder and the modulation orders $Q_{m,1}$ and $Q_{m,2}$. Typically, the MCS indicator may be used along with the resource allocation (number of resource elements) to determine the transport block size. The MCS indicators may also identify other information such as the redundancy version used by user data channel encoders for uplink hybrid ARQ. An example of how an MCS indicator can identify the coding rate and the modulation order is given in the table below which is taken from 3GPP 36.213 Sec. 8. The resource allocation indicator identifies the set of frequencies for the uplink transmission and therefore the number of subcarriers used in the transmission, $M_{sc}$. By combining the resource allocation indicator and the MCS indicators, the transport blocks sizes $TB_1$ and $TB_2$, may be calculated. The control allocation parameters are the offset factors $\tilde{\beta}_1$ and $\tilde{\beta}_2$ which are used to scale the number of symbols allocated to coded control information on each of the multiplexed codewords. The number of coded control symbols associated with the first transport block (i.e. a first quantity of transmissions associated with TN are calculated in three steps. First tentative control symbol allocations $\hat{Q}_1'$ is calculated as the product of number of control information bits O, number of allocated subcarriers $M_{sc}$, the number of DFT-SOFDM symbols $N_{sym}$, the offset factor for the first transport block, $\tilde{\beta}_1$, are multiplied, and the result is divided by a function $f_1$ of the two transport block sizes, $TB_1$ and $TB_2$ to give the product $$\hat{Q}_1' = \frac{O \cdot \tilde{\beta}_1 \cdot M_{sc} \cdot N_{sym} \cdot L_1}{f_1(TB_1, TB_2)}$$

Next, the same product is formed using the second offset factor $\tilde{\beta}_2$ to calculated number of coded control symbols associated with the second transport block (i.e. a second quantity of transmissions associated with $TB_1$)

$$\hat{Q}_2' = \frac{O \cdot \tilde{\beta}_2 \cdot M_{sc} \cdot N_{sym} \cdot L_2}{f_2(TB_1, TB_2)}$$

Using the function $f_2$. It may be desirable to limit the number of coded control symbols to a maximum value. For example the data/control multiplexers may be less complex to implement if there is an upper limit on the maximum number of coded control symbols to be multiplexed. If this limit is denoted $\hat{Q}_{max}$, the number of coded control symbols is then calculated in the third step as the following (wherein the limit $Q_{max}$ may be different for each transport block e.g. for each transport block the $Q_{max}$ may be based upon the number of spatial layers associated with a transport block, for a Transport block with one spatial layer, the $Q_{max}$ may be X, and for a TB with two spatial layers, $Q_{max}$ may be two times X, i.e. 2X)

$$Q_1' = \min(\hat{Q}_1', \hat{Q}_{max}) = \min\left(\left\lceil \frac{O \cdot \tilde{\beta}_1 \cdot M_{sc} \cdot N_{sym} \cdot L_1}{f_1(TB_1, TB_2)} \right\rceil, Q_{max}'\right),$$

$$Q_2' = \min(\hat{Q}_1', \hat{Q}_{max}) = \min\left(\left\lceil \frac{O \cdot \tilde{\beta}_2 \cdot M_{sc} \cdot N_{sym} \cdot L_2}{f_2(TB_1, TB_2)} \right\rceil, Q_{max}'\right), .$$

Herein $\lceil x \rceil$ denotes the ceil function which gives the smallest integer that is greater than or equal to x. Instead of ceil function, other functions for approximating a floating point value x to an integer may be used. For instance floor(x), gives the largest integer that is smaller than or equal to x, or round (x), which gives the nearest integer to x may be used instead of the ceil function.

It should be noted that the functions $f_1$ and $f_2$ are functions either signaled in a control message or programmed into the wireless units.

Yet another embodiment of control allocation calculator 408 is described next. In this embodiment the scheduling information and control allocation parameters are the same as in the previous embodiment. The first two steps consist of forming the tentative control symbol allocations $$\hat{Q}_1' = \frac{O \cdot \tilde{\beta}_1 \cdot M_{sc} \cdot N_{sym} \cdot L_1}{TB_1}$$

and as $$\hat{Q}_2' = \frac{O \cdot \tilde{\beta}_2 \cdot M_{sc} \cdot N_{sym} \cdot L_2}{TB_2}.$$

Note that the term $TB_1/M_{sc}N_{sym}$ may be considered as an approximation of the spectral efficiency (or a nominal spectral efficiency) of a transmission of the first transport block with an allocation of $M_{sc}$ subcarriers and $N_{sym}$ DFT-SOFDM symbols. The number of coded control symbols is therefore proportional to the inverse of the nominal spectral efficiency with a proportionality constant of the offset factor $\tilde{\beta}_1$. Again, limiting to a maximum number of symbols may be performed in the last step or the steps may be combined together to be implemented with lesser number of steps.

Yet another embodiment of the control allocation calculator 408 is described next. The control allocation parameters are an offset factor $\tilde{\beta}_1$ and a relative offset factor $\alpha$. The first step in calculating the control symbol allocation $\tilde{Q}_1$ and $\tilde{Q}_2$ is identical to the previous two embodiments, weighting the spectral efficiency by the offset factor $\tilde{\beta}_1$ $$\hat{Q}_1' = \frac{O \cdot \tilde{\beta}_1 \cdot M_{sc} \cdot N_{sym} \cdot L_1}{TB_1}.$$

The second step calculates the tentative control symbol allocation $\hat{Q}_2'$ by weighting the spectral efficiency of a second transport block transmission by the product of the offset factor and the relative offset factor:

$$\hat{Q}_2' = \frac{O \cdot \tilde{\beta}_2 \cdot M_{sc} \cdot N_{sym} \cdot L_2}{TB_2}.$$

Limiting to $Q_{max}'$ symbols may again be applied in the last step. The use of a relative offset factor instead of a second offset factor reduces the payload requirement of the control message. The relative offset factor may be explicitly signaled or implicitly derived from the scheduling information, the uplink grants, or a higher layer signaled parameter.

Yet another embodiment of the control allocation calculator 408 is described next. The control allocation parameters is the offset factor $\tilde{\beta}_1$. The tentative first codeword control symbol allocation $\hat{Q}_1'$ associated with the first transport block is calculated as above in step 1:

$$\hat{Q}_1' = \frac{O \cdot \tilde{\beta}_1 \cdot M_{sc} \cdot N_{sym} \cdot L_1}{TB_1}.$$

The tentative second codeword control allocation associated with the first transport block is again calculated in step 2 as a weighting of the spectral efficiency of a second transmission of the second transport block. However the proportionality factor is the product of the offset factor $\tilde{\beta}_1$ and a relative offset specified by a function h of the MCS indicators $MCS_1$ and $MCS_2$, the number of allocated subcarriers $M_{sc}$, and the number of DFT-SOFDM symbols $N_{sym}$:

$$\hat{Q}_2' = \frac{O \cdot \tilde{\beta}_1 \cdot h(MCS_1, MCS_2, M_{sc}, N_{sym})M_{sc} \cdot N_{sym} \cdot L_2}{TB_2}.$$

Where the $MCS_1$, and $MCS_2$ are defined as the ration of the transport block size divided by the product of number of frequency subcarriers and number time-domain DFT-SOFDM symbols. Alternative, the two MCS values may defined to also include the number of spatial layers, i.e. by diving further by the number of spatial layers The function h may be specified in a table form or may be signaled by a control message. Limiting to $Q_{max}'$ symbols may be again applied in the last step.

Yet another embodiment of the control allocation calculator 408 is described next. The control allocation parameters is the offset factor $\tilde{\beta}_1$. Here the control symbol allocations for both multiplexed codewords are equal and are calculated in two steps. The first step generates the tentative control symbol allocation $$\hat{Q}_1' = \frac{O \cdot M_{sc} \cdot N_{sym} \cdot \tilde{\beta} \cdot L_1}{f(MCS_1, MCS_2, M_{sc})}$$

$$\hat{Q}_2' = \frac{O \cdot M_{sc} \cdot N_{sym} \cdot \tilde{\beta} \cdot L_2}{f(MCS_1, MCS_2, M_{sc})}$$

where the function $f$ is a function of the MCS indicators and the number of subcarriers in the allocation obtained from the scheduling information. One example of the function $f$ is a weighted combination of the transport block sizes with the weights being the inverse of the modulation orders. The following is an example definition of the function.

$$f(MCS_1, MCS_2, M_{sc}) = TB_1 + TB_2.$$

The transport block sizes and modulation orders may be obtained from the MCS indicators and the number of allocated subcarrier as described previously. The above definition of $f$ can be shown to correspond weighting by the inverse of the sum of the spectral efficiencies of both codewords. Using this definition of $f$, the tentative control symbol allocation on the two multiplexed codewords is determined as follows.

$$\hat{Q}_1' = \frac{O \cdot M_{sc} \cdot N_{sym} \cdot \tilde{\beta} \cdot L_1}{TB_1 + TB_2}$$

$$\hat{Q}_2' = \frac{O \cdot M_{sc} \cdot N_{sym} \cdot \tilde{\beta} \cdot L_2}{TB_1 + TB_2}.$$

Other examples of the function $f$ correspond to the minimum or maximum of the spectral efficiencies of transmission of the two transport blocks and taking the number of spatial layers into account:

$$f = \min(TB_1 \cdot L_1, TB_2 \cdot L_2)$$

and $$f = \max(TB_1 \cdot L_1, TB_2 \cdot L_2).$$

Limiting to symbols to a maximum value may again be applied in the last step.

Yet another embodiment of the control allocation calculator 408 is described next. The scheduling information consists of the resource allocation indicator as described previously, one or more MCS indicators, and an indicator of the number of transport blocks to be transmitted, T, where T takes multiple values such as 1, 2 and/or 3, etc. The number of transport blocks to be transmitted may be signaled by various means such as explicitly or implicitly in a scheduling control message or the uplink grants received by the device. Note that based on the uplink grant, the scheduling information for each of the transport blocks may be determined. For two or more transport blocks, the corresponding scheduling information may be derived from transport block-specific fields such as MCS, etc, or transport block-common fields such as resource block, PMI indicator, etc within the Uplink grant. For example one format of scheduling message (or uplink grant) may correspond to a single transport block transmission while a second format corresponds to two transport block transmission, etc. The number of transport blocks may also be indicated by setting an MCS field and other fields in the uplink grants (such as NDI, CQI request bit) in the scheduling control message to a reserved value or a reserved code point (e.g. MCS=29 can be reserved to imply that the transport block is disabled or there is no uplink resources defined for the corresponding transport block). The control allocation parameter in this embodiment comprises of two three offset factors. A first set of offset factors are used when only one transport block is scheduled for transmission and a second set of offset factors is used when both the transport blocks are scheduled for transmission. The first offset factor $\beta_1$ is used when a single transport block is to be transmitted, i.e. T=1, and second and third offset factors $\tilde{\beta}_1$ and $\tilde{\beta}_2$ are used when two transport blocks are transmitted, i.e. T=2. Tentative control symbol allocations on the multiplexed codewords $\hat{Q}_1'$ and $\hat{Q}_2'$ are calculated again by scaling the inverse of the spectral efficiency. In the first step a test is performed on T. If T=1, $\hat{Q}_1'$ is calculated in the second step as $$\hat{Q}_1' = \frac{O \cdot \beta_1 \cdot M_{sc} \cdot N_{sym} \cdot L_1}{TB_1}.$$

while if T=2, $\hat{Q}_1'$ and $\hat{Q}_2'$, are calculated as $$\hat{Q}_1' = \frac{O \cdot \tilde{\beta}_1 \cdot M_{sc} \cdot N_{sym} \cdot L_1}{TB_1}$$

$$\hat{Q}_2' = \frac{O \cdot \tilde{\beta}_1 \cdot M_{sc} \cdot N_{sym} \cdot L_2}{TB_2}.$$

Alternatively, a first set of offset factors is used when the control information is to be multiplexed on the transmission resources associated with the one transport block and a second set of offset factors is used when the control information is multiplexed on the transmission resources associated with both the transport blocks.

In order to reduce the control channel overhead, a single two codeword, $\tilde{\beta}$, offset may be signaled instead of individual offsets $\tilde{\beta}_1$ and $\tilde{\beta}_2$. In this case $\hat{Q}_1'$ and $\hat{Q}_2'$ are calculated as in the previous two equations with $\tilde{\beta}_1 = \tilde{\beta}_1 = \tilde{\beta}$. To further reduce control channel the control allocation parameters may consist of an overhead a two codeword relative offset factor $\Delta_{offset}$ may be signaled in addition to $\beta$. In this case $\tilde{\beta}_1 = \tilde{\beta}_2 = \Delta_{offset}\beta$ and control symbol allocations are calculated as above. Limiting to $Q_{max}'$ symbols is again applied in the last step.

Yet another embodiment of the control allocation calculator 408 is described next. The control allocation parameter is an indicator that identifies the set of user data codewords (or transport blocks) which are to be multiplexed with control information. For example the control allocation parameter may consist of the value I which identifies the following user data codewords for multiplexing with control information according to following table

| I | User Data Codewords Multiplexed |
|---|---|
| 0 | 1 |
| 1 | 2 |
| 2 | 1, 2 |

In another embodiment, control information is time domain duplexed with user data. One set of DFT-SOFDM symbols in a transmission time interval are used for transmitting only control information while user data is transmitted in the remaining DFT-SOFDM symbols of the transmission time interval. The number of uplink resources for transmitting control information is therefore $M_{sc} \cdot L_{cntl}$ where $N_{sym}^{cntl}$ is the number of DFT-SOFDM symbols dedicated to transmitting control information and $L_{cntl}$ is the number of layer used for transmission of control information. The number of subcarrier $M_{sc}$ and $L_{cntl}$ can be identified from resource allocation scheduling information. One or more types of control information may be transmitted on the DFT-SOFDM control symbols. For example CQI and rank may both be transmitted together or CQI and ACK/NAK. The wireless terminal calculates $N_{sym}^{cntl}$ based on scheduling information and possibly control parameters.

The quantity $N_{sym}^{cntl}$ may be calculated according to the formula $$N_{cntl} = \left\lceil \frac{\beta \cdot M_{sc} \cdot O \cdot L_d \cdot Q_d \cdot N_{sf}}{L_c Q_c \left(1 + \beta \frac{Q_d L_d}{Q_c L_c}\right)} \right\rceil$$

Where $Q_d$ is the modulation order for the user data, $L_d$ is the number of layers for the user data, $L_c$ is the number of layer for the control information, and $N_{sf}$ is the number of DFT-SOFDM symbols in the subframe.

If multiple types of control information are sent, the quantity $\beta L_{cntl} Q_c$ in the above equation should be replaced with $$\frac{\beta L_{cntrl} Q_c}{O} \rightarrow \frac{\beta_1 L_{cntrl,1} Q_{c,1}}{O_1} + \frac{\beta_2 L_{cntrl,2} Q_{c,2}}{O_2}$$

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:
1. A method in wireless communication terminal device, the method comprising:

determining a first quantity of transmission resources corresponding to a first transport block based on at least a portion of first and second scheduling information;

determining a second quantity of transmission resources corresponding to a second transport block based on at least a portion of the first and second scheduling information; and transmitting, from the wireless communication device, encoded control bits on a subset of a first set of transmission resources associated with the first transport block according to the first quantity of transmission resources and on a subset of a second set of transmission resources associated with the second transport block according to the second quantity of transmission resources;

wherein the first set of transmission resources comprises assigned transmission resources on a first set of spatial layers based on transmission rank information;

wherein the second set of transmission resources comprises assigned transmission resources on a second set of spatial layers based on the transmission rank information;

wherein the first set of spatial layers is different than the second set of spatial layers; and wherein the control block is transmitted on the first subset of the first set of transmission resources, the first subset of the first set of transmission resources comprises transmission resources on each of the spatial layers in the first set of spatial layers and on the second subset of the second set of transmission resources, the second subset of the second set of transmission resources comprises transmission resources on each of the spatial layers in the second set of spatial layers.

2. The method of claim 1 wherein the portion of the first scheduling information comprises a modulation and coding scheme, a resource allocation, and a number of spatial layers, and wherein the portion of the second scheduling information comprises a modulation and coding scheme, a resource allocation, and a number of spatial layers.

3. The method of claim 1, wherein the determination of the first quantity of transmission resources is also based on a first control parameter.

4. The method of claim 3, wherein the determination of the second quantity of transmission resources is further based on the first control parameter.

5. The method of claim 1, wherein the determination of the second quantity of transmission resources is also based on a second control parameter.

6. The method of claim 1, wherein the determination of the first quantity of transmission resources is further based on at least a portion of the second scheduling information.

7. The method of claim 1, wherein the determination of the second quantity of transmission resources is further based on at least a portion of the first scheduling information.

8. The method of claim 1, wherein the first quantity of transmission resources and second quantity of transmission resources are same.

9. The method of claim 1, wherein a transmission resource is equal to one modulation symbol.

10. The method of claim 1 further comprising receiving a scheduling grant message comprising the first scheduling information, the second scheduling information and the transmission rank information.

11. The method of claim 1 wherein the transmission resource is a smallest transmission unit comprising a modulation symbol occupying one spatial layer and one time resource unit.

12. The method of claim 1 wherein the first quantity of transmission resources is equal to the second quantity of transmission resources, transmission resources of the first subset of the first set of transmission resources and the second set of transmission resources occupy the same time resources but different spatial layers.

13. A method in a wireless communication terminal device, the method comprising:

determining that transmission resources on which control information is to be multiplexed correspond to either one or two transport blocks;

selecting either a first control parameter or a second control parameter based on a number of transport blocks, wherein a first control parameter is selected when the control information is to be multiplexed on transmission resources associated with only one transport block and a second control parameter is selected when the control information is to be multiplexed on transmission resources associated with both transport blocks; and determining transmission resources for control information based on the selected control parameter and a portion of scheduling information associated with a transport block on which control information is to be multiplexed.

* * * * *